Sept. 28, 1954 R. G. BICKFORD 2,690,178
AUTOMATIC APPARATUS FOR ADMINISTERING DRUGS
Filed Nov. 13, 1950 6 Sheets-Sheet 1
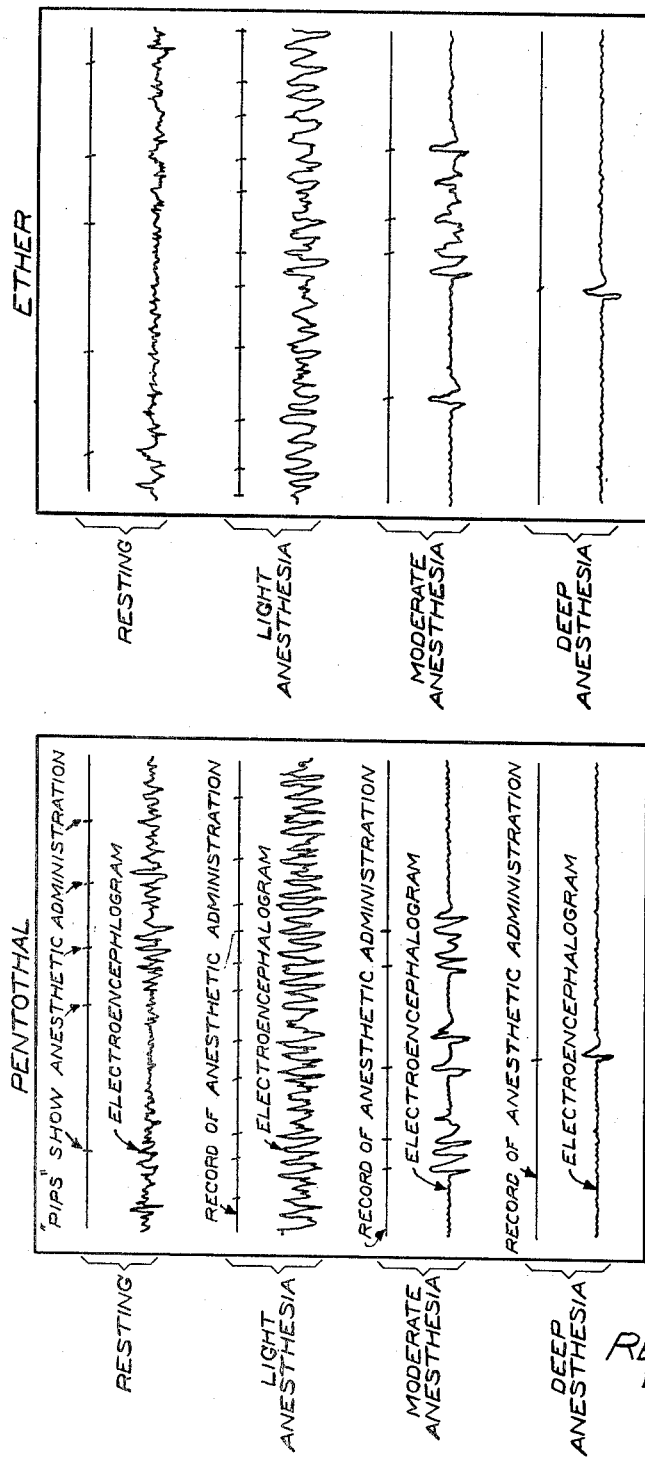
INVENTOR.
REGINALD G. BICKFORD
BY
ATTORNEYS INVENTOR.
REGINALD G. BICKFORD
BY Paul, Paul & Moore
ATTORNEYS Sept. 28, 1954 R. G. BICKFORD 2,690,178
AUTOMATIC APPARATUS FOR ADMINISTERING DRUGS
Filed Nov. 13, 1950 6 Sheets-Sheet 3
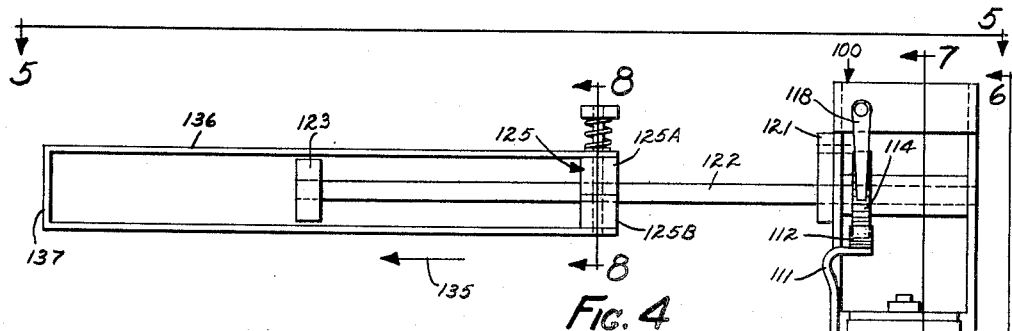
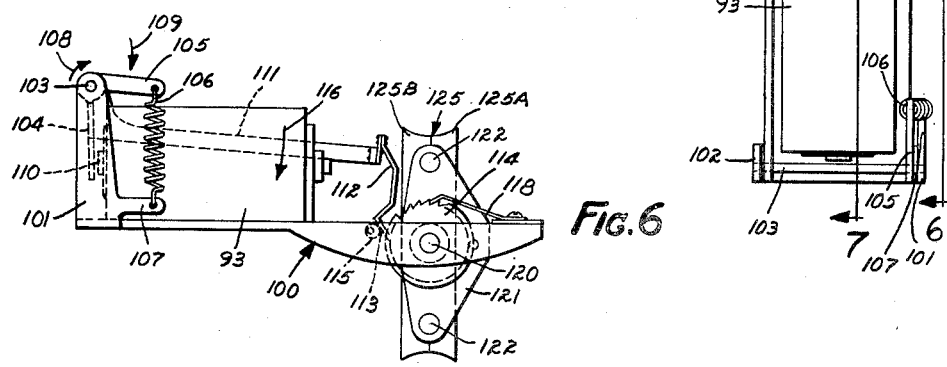
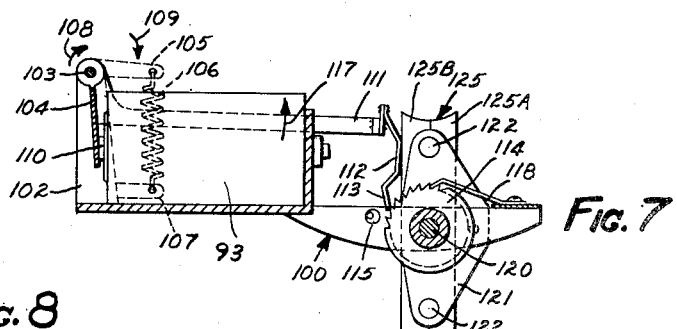
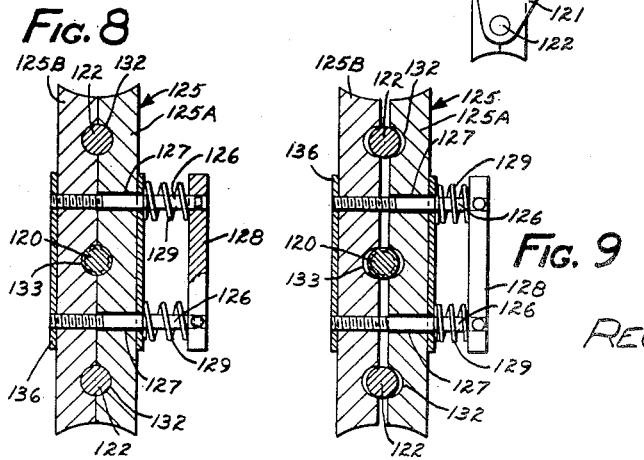
INVENTOR.
REGINALD G. BICKFORD
BY
Paul, Paul & Moore
ATTORNEYS

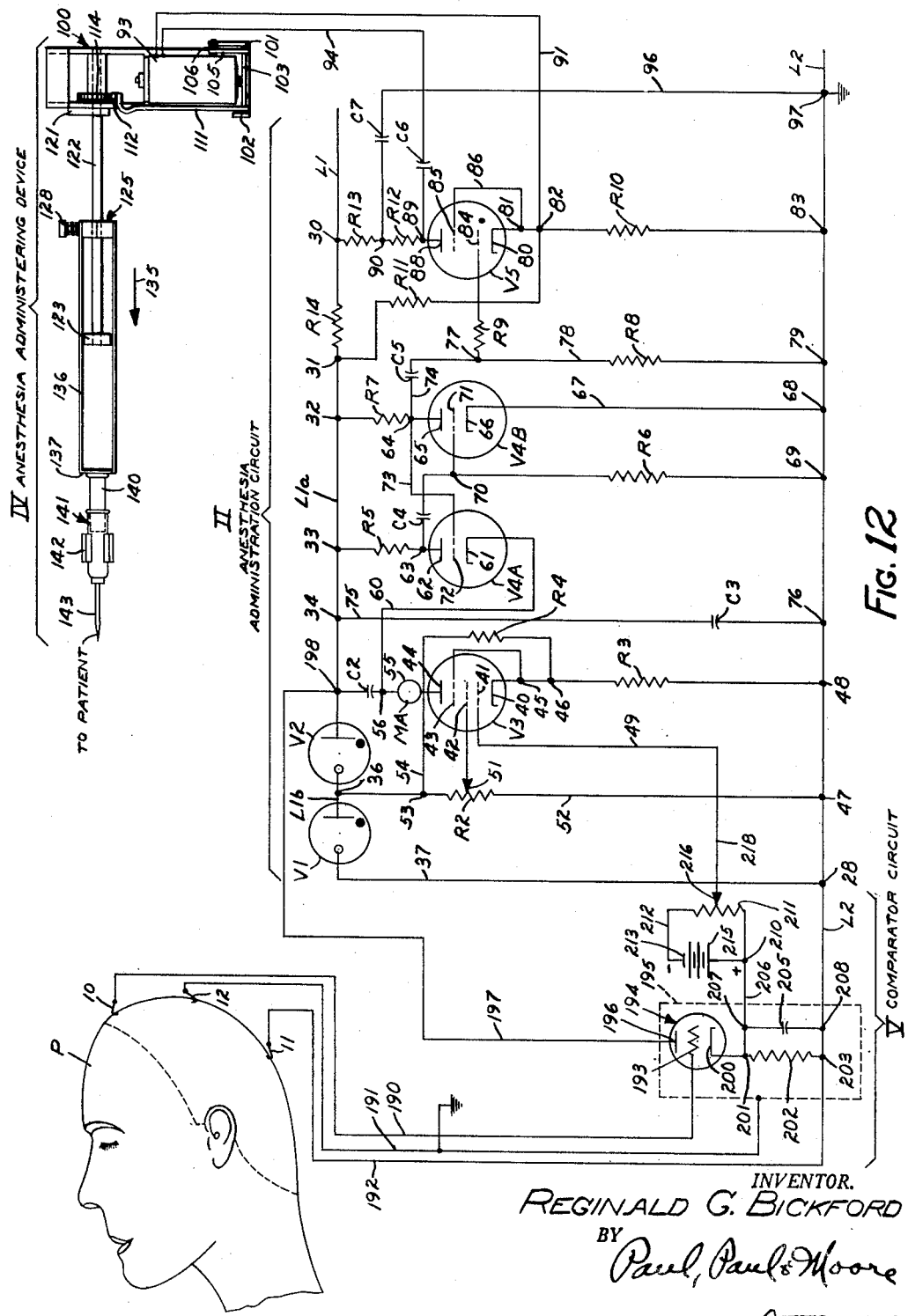

Patented Sept. 28, 1954

2,690,178

UNITED STATES PATENT OFFICE 2,690,178

AUTOMATIC APPARATUS FOR ADMINISTERING DRUGS

Reginald George Bickford, Rochester, Minn., assignor to Research Corporation, New York, N. Y., a corporation of New York Application November 13, 1950, Serial No. 195,343

16 Claims. (Cl. 128—213)

This invention relates to automatic apparatus for the administration of drugs generally, and more particularly anesthetics to a patient in response to an electrical signal originating in the patient or generated as a result of a bodily function of the patient. There are many drugs, the administration of which should be in accordance with the response of the patient. Heretofore, administration of such drugs has been based solely upon the general experience of the physician with the use of the drugs, plus such outwardly visible, audible or otherwise sensible symptoms of response as may be observed by the physician during administration of the drug.

I have discovered that the use of anesthetics such as ether or barbiturates (for producing anesthesia) or the use of anticonvulsants, such as pentothal, luminal or amytal for treatment of the condition of continuous epileptic seizure and in the use of many other drugs the patient's response may be utilized for controlling the rate of drug administration. The response of the patient is either the electrical wave pattern of the patient (such as the electrical brain wave pattern) or an electrical signal generated in consonance with a function or functions of the patient, such as an electrical signal proportional to heartbeat, respiration, skin temperature, etc. Such signals are in accordance with my discoveries used for the automatic administration of the drug.

For example, referring specifically to the technique of production of anesthesia, the anesthetist in the course of giving an anesthetic agent, receives a continuous flow of information through his sense organs (eyes, ears and hands) which he evaluates and, in the light of previous experience, utilizes to form an estimate of the patient's depth of anesthesia. He compares this estimate mentally with a standard depth of anesthesia, based upon his previous experience, and on the basis of that experience administers the anesthetic to the patient in an amount such as is required by the surgeon for a particular stage of the operation, and then takes appropriate action to increase or decrease the anesthetic concentration as the operation progresses, or in accordance with the surgeon's request. The administration of anesthesia in accordance with this known manner is subject to several faults. As a first form of error, the anesthetist may not properly evaluate the information received from the patient, with a consequent erroneous estimate of the anesthetic depth. Thus, an inexperienced or inattentive anesthetist may not properly evaluate the appearance of the eyes, the sound of the patient's breathing, or the rapidity and strength of the patient's pulse, and consequently make an erroneous or mistaken estimate of the depth of anesthesia with the result that the anesthetist may erroneously administer or fail to administer requisite anesthetic.

A second form of error may be characterized as the slowness or lag in the response of the anesthetist to information received from the patient, with the result that the anesthetic is administered too late, in respect to the depth of anesthesia at any particular instant. As a consequence even among experienced anesthetists the patient is not infrequently alternately over-anesthetized or under-anesthetized, sometimes with wide variations between these extremes.

Studies made in this invention have shown that in the animals investigated, namely rabbit, cat, monkey and man, a simple and characteristic relationship exists between the depth of anesthesia produced by anesthetics such as the barbiturates or ether and the integrated potential output of the cortex of the patient. Thus, in accordance with this invention it has been discovered that electrical integration of the amplified electroencephalographic signal may be utilized as the basis for administration of the anesthetic. It has further been discovered that administration of the anesthetic may be accomplished automatically in relation to the integrated, amplified electroencephalogram, and that varying depths of anesthesia may be selected as desired. It has also been discovered that by limiting response to certain electrical frequencies produced by the brain wave for utilization in the automatic administration of anesthesia, it is possible to avoid interference due to low and high frequency extraneous signals.

It has also been discovered in accordance with the invention that the amplified brain potential may be compared with a standard voltage and the difference therefrom utilized for actuating the administration of anesthesia, thereby to provide an error-actuated system.

It is a general object of the invention to provide a method and apparatus for administering drugs to a patient in response to a signal produced by or in consonance with a function or functions of the patient.

It is a further general object of the invention to provide methods and apparatus for administering drugs, such as anesthetics, anti-convulsants or the like to a patient in response to a signal function of the patient or in response to an electrical brain wave function of the patient.

It is a more specific object of the present invention to provide an apparatus and method for administering anesthesia which is automatic in character and in which the anesthesia is administered responsive to the potential output of the cortex of the patient.

It is a further object of the invention to provide a method and apparatus wherein anesthetic is administered at a rate proportional to the integrated potential output of the cortex of the patient, and optionally recording said cortex potential and anesthetic administration.

It is another object of the invention to provide a method and apparatus for administering anesthesia wherein the summation of values of the brain potentials are utilized for proportioning and regulating the flow of anesthetic to the patient.

It is a further object of the invention to provide an apparatus for administering anesthetic wherein electrical signals from the scalp of the patient are amplified, rectified and stored as a charge on an electrical condenser, and wherein the charge is from time to time utilized for proportionately delivering anesthetic to the patient.

It is an additional object of the invention to provide an apparatus wherein amplified, rectified and integrated electrical signals received from the scalp of the patient are used to charge a condenser to a specified voltage and wherein an auxiliary circuit is utilized automatically to discharge said condenser when the voltage reaches a prescribed amount, and upon discharge of the condenser to use a signal thereby established for motivating a pump for moving anesthetic from a supply to the patient and for making a record of such delivery.

It is another object of the invention to provide a method and apparatus wherein anesthetic is administered at a rate proportional to the variation of the brain potential signal from an established potential so as to provide an error-actuated system.

It is a further object of the invention to provide a method and apparatus wherein the signal includes the complex wave pattern brain potential and may also include extraneous signals of high frequencies or low frequencies, originating in the brain or as stray signals, or filtered by means of a band pass filter and then utilized for the administration of anesthetic to the patient.

Other and further objects of the invention are those inherent in the apparatus herein illustrated, described and claimed.

The invention is illustrated with reference to the drawings in which corresponding numerals refer to the same parts and in which Figure 1 is a diagram showing the brain wave potentials and related signals showing administration of anesthesia where the anesthesia is pentothal, for conditions in which the patient is "resting," for "light anesthesia," "moderate anesthesia" and "deep anesthesia," the related record of anesthetic administration being shown for each condition;

Figure 2 corresponds to Figure 1 except where the anesthesia is ether. This figure likewise shows the brain wave potentials when the patient is "resting" and during "light anesthesia," "moderate anesthesia" and "deep anesthesia," the related record of anesthetic administration being shown for each condition;

Figure 4 is a plan view of the stepping relay and associated apparatus used for administering the anesthesia to the patient;

Figure 6 is an end elevational view in the direction of arrows 6—6 of Figure 4 showing the stepping relay;

Figure 7 is a sectional view taken along the line 7—7 of Figure 4, partly in section, showing the stepping relay in another position as compared with Figure 4;

Figure 8 is a sectional view taken along the line and in the direction of arrows 8—8 of Figure 4 and shows the screw block which is actuated by the stepping relay for operating the anesthesia administering syringe;

Figure 3:
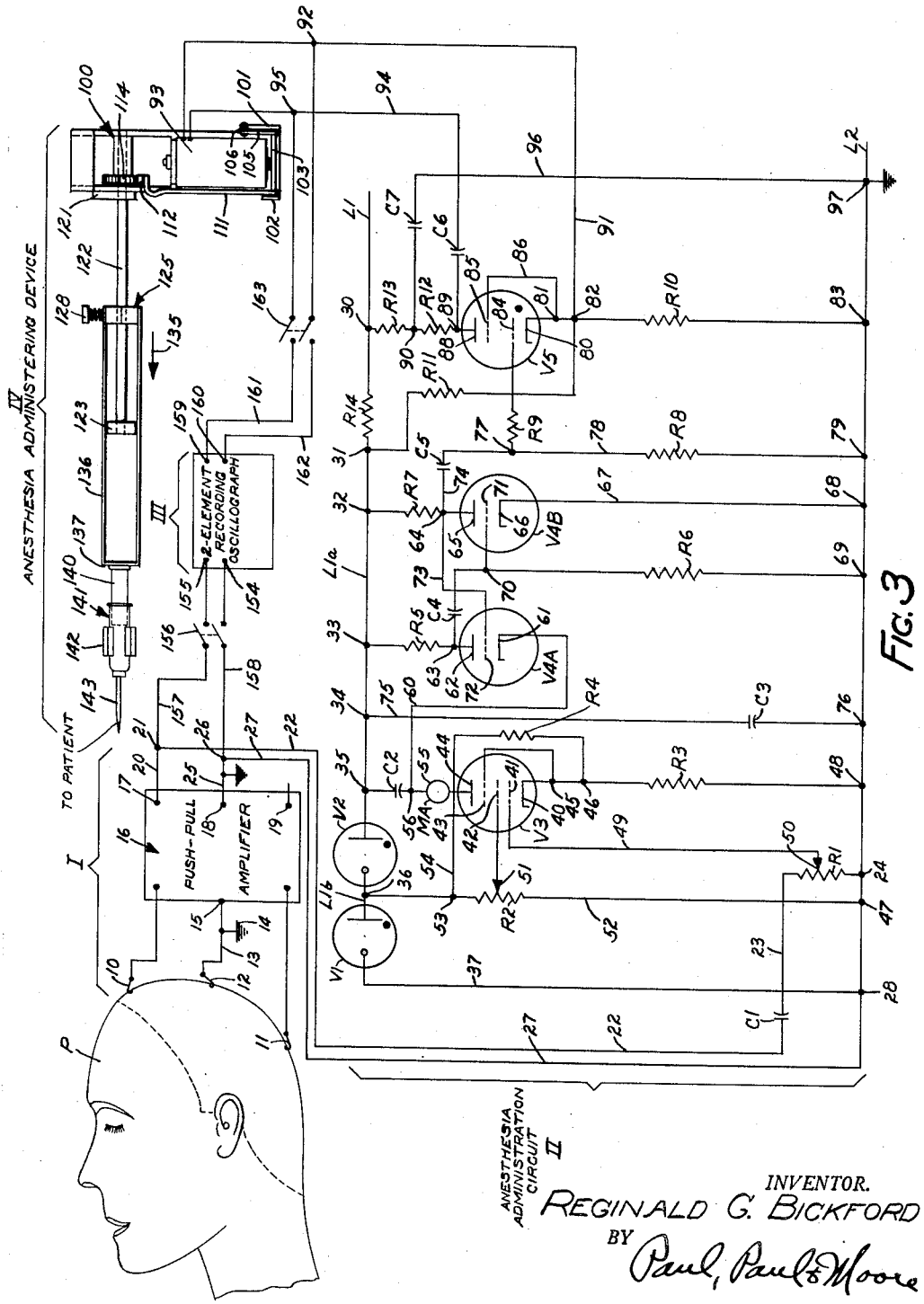
Figure 3 is a schematic view showing the wiring diagram of the apparatus of the invention, together with the mechanical components shown attached to the patient.
Figure 5:
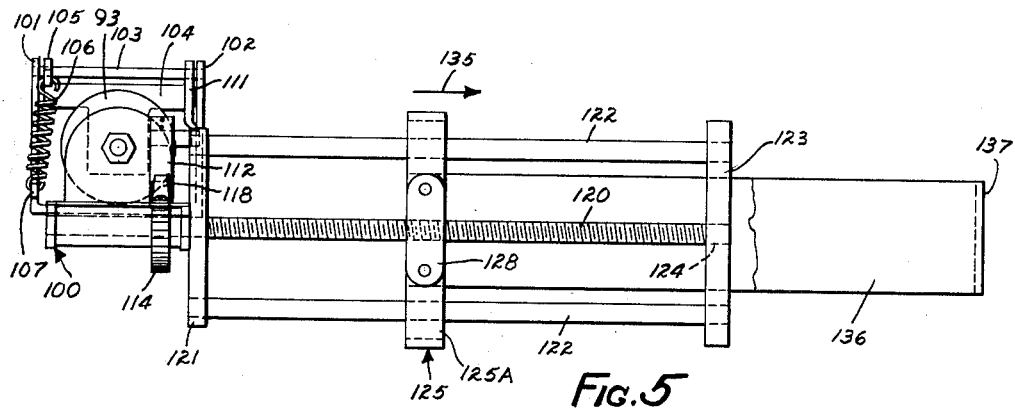
Figure 5 is a side elevational view in the direction of arrows 5—5 of Figure 4, showing the stepping relay and mechanical apparatus associated therewith for moving the anesthetic to the patient.
Figure 10:
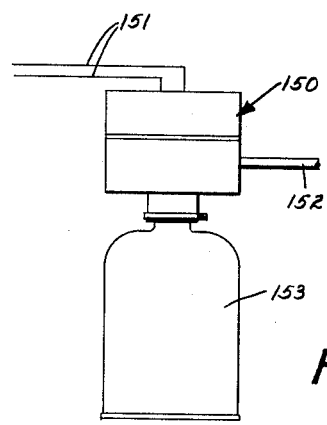
Figure 11:
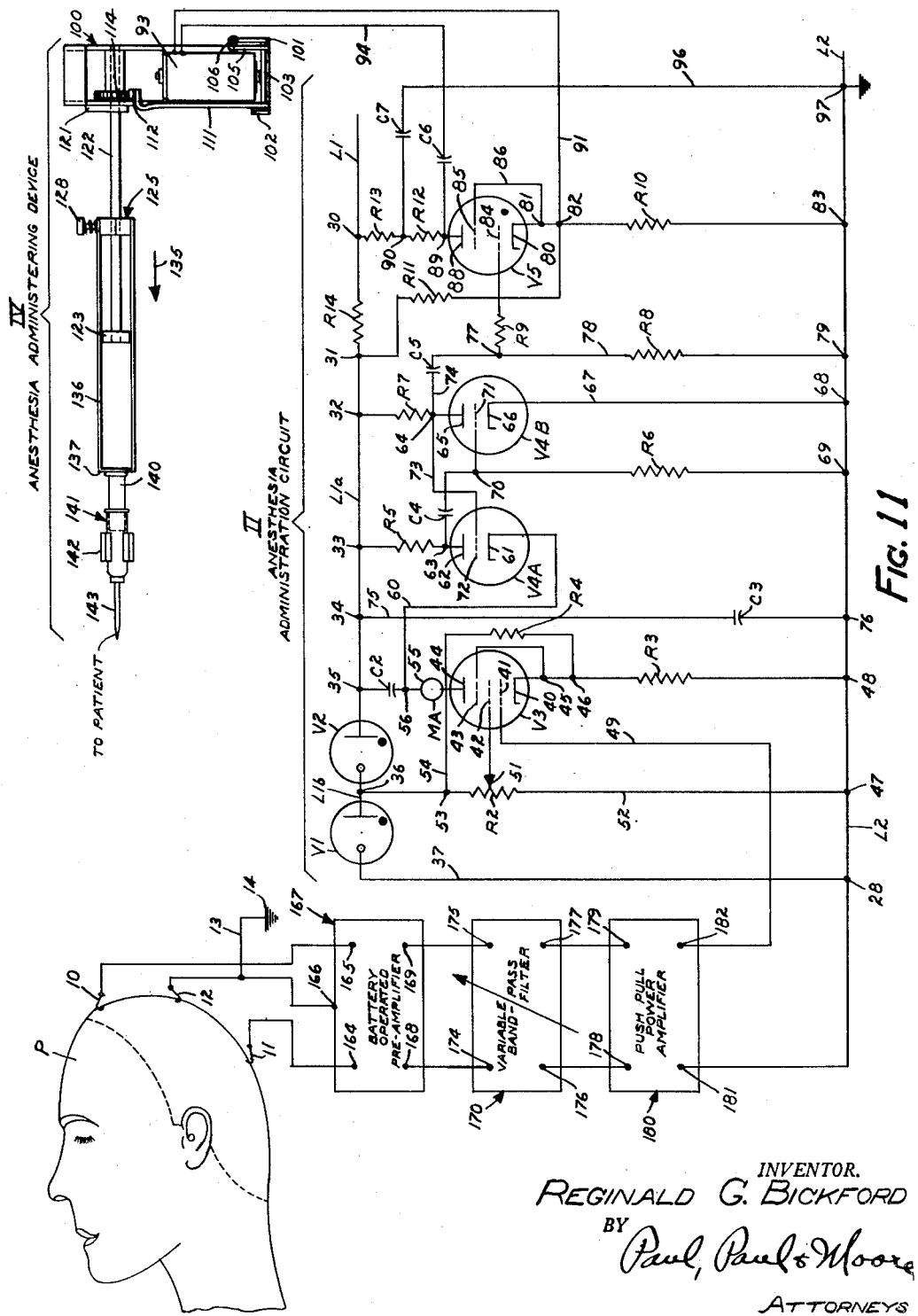

Figure 9 corresponds to Figure 8 and shows the screw block in open position for purposes of adjustment;

Figure 10 is a side elevational view of an electrical pump utilized in some instances for pumping an anesthetic such as ether;

Figure 11 is a schematic view similar to Figure 3, modified to include the band pass filter; and Figure 12 is a schematic view likewise corresponding to Figure 3 showing an error-actuated system.

The methods and apparatus of the invention relate broadly to automatic administration of drugs to a patient in response to a signal function orginating in or generated in consonance with a physical function of the patient. Such signal functions generated in the patient are broadly denoted the "physiological electrical potentials" of the patient, and that term will be used in the present specification and claims broadly to denote such signal functions. The most common situation in which the invention is of particular usefulness is the automatic administration of anesthetics, which the instant discoveries and/or invention for the first time makes possible. There are many other uses, however, such as the automatic administration of anti-convulsant drugs in the treatment of continuous epileptic seizure, i. e. "status epilepticus"; the automatic adminstration of heart stimulants, respiratory stimulants, thyroid extracts, intravenous feeding, etc. wherein in each instance a bodily function of the patient (which may be an electrical brain wave function) or a physical function translated into an electrical function (example: pulse beat to electrocardiagram) is, in accordance with this invention, used to control the rate at which the drugs, etc. are administered to the patient. Therefore, the invention described and claimed must be considered broad.

However, for simplicity in explanation but without limitation of the scope of the invention and/or discoveries described and claimed, this specification will particularly refer to that instance in which this subject has most widespread usefulness, namely for the administration of anesthetics. Therefore, it will be understood that while the illustrations are specific, they do not limit the scope of the invention.

The electrical brain wave signal function has a variety of names. Thus, it is sometimes called the "electroencephalographic potential." In the Mayo Clinic wherein there was done the work upon which the present invention is based, this electrical brain wave signal is often called the "E. E. G." which is an abbreviation for "electroencephalogram." Again, such brain wave signal has been called "Cortical potential." For the purposes of this specification and claims the term "electroencephalographic potential" will be used to denote such brain wave signal function.

Method phases of the invention can be explained most easily with reference to the drawings related to the invention. Thus, referring to the drawings and particularly to Figures 1 and 2, in each of these figures there are illustrated related "resting," "light anesthesia," "moderate anesthesia" and "deep anesthesia" conditions of oscillographic records. These oscillographic recordings are, in each instance the electroencephalogram recording of the brain potential or "electroencephalographic potential" of the patient. With each such recording there is shown the related record of administration of anesthetic which is carried out in accordance with the method of the invention. Figure 1 shows these factorss where the anesthetic is pentothal, which is injected into the patient's vein by means of a suitable syringe. In Figure 2 the aforesaid factors are shown where the anesthetic is ether, which is administered to the patient by utilizing the pumping apparatus or syringe of the invention, to supply the ether to the air system of the patient, as by the use of a customary respiratory vaporizer and mask, into which the anesthetic is pumped or injected in accordance with the actuation of the apparatus of the invention.

Referring to Figure 1 it has been discovered in accordance with the invention that the brain wave pattern or electroencephalographic potential under the condition of "resting" (which is shown opposite the bracket marked "Resting") is a complex pattern composed of varied frequencies, the signals being of considerably variable amplitude. As the condition of the patient reaches what is known as "light anesthesia" (the record of which is shown opposite the bracket so marked), the brain wave pattern increases in amplitude and the lower frequencies seem to predominate or at least to overshadow the higher frequencies insofar as amplitude is concerned, as compared with the "resting" condition. As the condition of the patient reaches what is known as "moderate anesthesia" the brain wave signals or electroencephalographic potential of the patient includes pulses of signals at spaced intervals, yet the amplitude of the individual pulses produced is of about the same order and magnitude as those in the "resting" and "light anesthesia" conditions. In this "moderate" stage of anesthesia there are medium to long intervals during which the signal is of only small amplitude at relatively higher frequency. When the patient reaches a condition of "deep anesthesia," the brain wave pattern of electroencephalographic potential shows only a very small amplitude higher frequency voltage variation for long intervals and with only an occasional lower frequency, larger amplitude wave imposed thereon at relatively infrequent intervals. The brain wave frequencies are mostly within the range of 3 to 30 cycles per second and the "lower" and "higher" frequencies referred to in this explanation are within substantially that range.

The brain wave patterns or electroencephalographic potentials produced when the anesthetic is ether are of generally the same pattern. Thus, during the "resting" period the high and low frequencies (mostly within the range of 3 to 30 cycles per second) are intermixed and a complicated wave pattern results, the average amplitude of which is comparatively much less than during conditions of "light anesthesia" where the lower frequencies in said range seem to increase in amplitude and predominate. Again, during conditions of "moderate" ether anesthesia, there are increasing intervals of very minor brain wave signals interspersed with groups of mixed frequency signals having an amplitude of the same order and magnitude as that of light anesthesia, but the duration of the signals forming the groups is of much less while under conditions of "deep" ether anesthesia the brain wave signal constituting the electroencephalographic potential settles down to a very minor signal with moderate amplitude pulses only at very infrequent intervals.

From the brain potential curves for the resting, light anesthetic, moderate anesthetic and deep anesthetic conditions, shown in Figure 1 and 2, it will be observed that regardless of whether the anesthetic is pentothal or ether, the brain (cortex) potential or electroencephalographic potentials, if considered as energy, increases from the condition of "resting" to the condition of "light anesthesia" and then decreases through the "moderate" anesthesia to a minimum at the "deep" anesthesia condition. Conversely considered, the energy of the brain (cortex) wave increases from the condition of "deep anesthesia" and continues to increase through the condition of "moderate" anesthesia to the condition of "light anesthesia." Advantage is taken of this discovery so as to provide for the administration of additional anesthetic when the patient begins to recover from a condition of deep or moderate anesthesia and such administration of anesthetic again brings the patient back to the desired level of anesthesia, depending upon the adjustment of the system.

In Figures 1 and 2 there are shown records of anesthetic administration above each brain wave pattern. These records or "traces" are horizontal lines with an occasional short vertical line or "pip" thereon which indicates the administration to the patient of a measured dose (unit amount) of anesthetic for the particular condition being recorded. Thus, for the "resting" condition, Figure 1, the record of pentothal administration (which is the horizontal line with 5 (five) "pips" on it above the chart showing the electroencephalographic potentials shows such 5 (five) units or "pips" for the time period covered by the record, whereas during "light anesthesia" there were 11 (eleven) units of pentothal administered which is due, as will later be shown, to the greater integrated amplified brain wave signal. To continue, when the patient reached the condition of "moderate anesthesia" there were again 5 (five) units of anesthetic (pentothal) administered generally in time with the lower frequency pulses of the patient's brain wave pattern, and when the condition of "deep anesthesia" was reached only 1 (one) unit of anesthetic was administered as indicated by the one "pip" on the trace.

Referring to Figures 3–9 the apparatus of the invention therein shown is one exemplary form of system for carrying out the method phases of the invention. Other forms are illustrated in Figures 11 and 12.

Referring to Figure 3 the system generally includes a responsive connection to the patient and an amplifier generally designated 16. The output of amplifier 16 shown under the bracket I is connected to the input of the anesthesia administering circuit shown opposite the bracket II and is optionally also connected to one element of a two-element recording oscillograph shown under bracket III. The electrical circuits for controlling the administration of the anesthesia shown opposite the bracket II have their output connected to the anesthesia administering device shown under the bracket IV, and such output circuits may also be connected to the second element of the two-element recording oscillograph III. The anesthetic administering device is connected back to the patient.

Thus, as shown in Figure 3 a connection is made by means of a small barbless hook 10 to one part of the scalp of patient P and another connection is made by means of a similar small barbless hook 11 to another portion of the patient's scalp. An intermediate connection is made by a third barbless hook 12, the latter being to the ground line 13 which is grounded at 14 and grounded to the chassis 15 of a push-pull amplifier generally designated 16. While the hooks 10 and 11 may be connected to various portions of the scalp, without greatly modifying the results, they are preferably made to the forepart and rear part of the scalp, as illustrated. It is only necessary that these hooks be inserted lightly under the skin in order to be responsive to the brain wave pattern of the patient P.

The amplifier 16 is a push-pull amplifier of conventional construction having input terminals connected to hooks 10 and 11 and input ground 13 connected to hook 12. The amplifier has output terminals 17, 18 and 19. The signal is derived between the output terminals 17 and 18, of which the latter is grounded, the signal on circuit 19 being wasted, so far as the system is concerned. The terminal 17 is connected through line 20 to junction 21 and thence continues through line 22 to condenser C1 and thence through line 23 to one terminal of the resistor R1 and through that resistor to junction 24 on line L2. Terminal 18 of the amplifier is connected through line 25 to junction 26 and thence through line 27 to junction 28 on line L2.

The amplified brain potential signal, which may also be designated the amplified potential of the cortex or amplified electroencephalographic signal is thereby impressed through condenser C1 upon the resistor R1.

The anesthesia administering circuits shown opposite the bracket II have power input lines L1 and L2 upon which a unidirectional potential of approximately 260 volts (for the specific circuits illustrated) is applied. Line L1 extends through junction 30 and thence through resistor R14 to junction 31, on line L1a, which extends through junctions 32, 33, 34 and 35 to one terminal of the voltage regulator tube V2 to junction 36 on line L1b, and thence through line L1b to a terminal of a second voltage regulator tube V1 which has its second terminal connected through line 37 to junction 28 on line L2. The tubes V1 and V2 are conventional voltage regulator tubes. The tube V1 has a potential drop of 150 volts across it and tube V2 has a potential drop of 108 volts across its terminals. Tubes V1 and V2 accordingly establish a potential of 150 volts on line L1b relative to line L2 and a potential of 258 volts on line L1a, relative to line L2, these potentials being regulated by the action of tubes V1 and V2, regardless of momentary voltage fluctuation on the supply line L1. If a separate circuit of regulated voltage is available, the tubes V1 and V2 may be dispensed with, or in those instances where supply voltage is sufficiently free from variation, the voltage regulation tubes may likewise be dispensed with. The particular potentials given for tubes V1 and V2, and the other specific constants mentioned herein for the remaining components of the circuit are merely illustrative. It is, of course, obvious that the circuit can be designed with equal facility for other potentials and using other constants.

Tube V3 is of the five element type and has a heated cathode 40, a control grid 41, a first screen grid 42 and a second screen grid 43, together with the anode 44, and serves to amplify and rectify the amplified brain potential signal (or cortex potential or electroencephalogram, however designated). The cathode 40 is heated by a filament not illustrated and is connected through junction 45 and through junction 46 to resistor R3 which is in turn connected to junction 48 on line L2. The control grid 41 is connected through line 49 to the adjustable terminal 50 on resistor R1, which may be moved along the resistor R1 to vary the input and hence the level of response of the system. Resistor R1 controls the depth of anesthesia of the patient in the overall operation of the system.

Grid 42 is connected through the variable tap 51 on resistor R2 which is connected by a line 52 to junction 47 on line L2 and has its opposite end connected through junction 53 to junction 36 on line L1b. The adjustment of tap 51 accordingly controls the potential applied to the first screen grid 42 and hence the level of activity of tube V3. The second screen grid 43 is connected to the cathode circuit at junction 45. A circuit extends from junction 53 above resistor R2 thence through line 54 and through resistor R4 to junction 46 on the cathode terminal of tube V3. From the anode 44 a circuit extends through the milliammeter 55 to the junction 56 and thence through condenser C2 to the junction 35 on the voltage regulated line L1a.

The capacitor C2 is a storage capacitor which accumulates and hence integrates the amplified brain wave signal. In the operation of the system the capacitor C2 is discharged whenever its voltage level reaches a prescribed value and in practice the periodicity of discharge is proportional over a measured longer time interval, to the integral of the amplified electroencephalographic potential (cortex potential). Condenser C2 serves as means for accumulating an electrical charge at a rate proportional to the integration of the electroencephalographic potential signal of the patient.

The discharge of capacitor C2 whereby the stored electrical energy is dissipated from time to time is accomplished by a triggering circuit composed of a pair of thermionic tubes V4a and V4b and associated circuit components which are connected in what is known as a "flip-flop" circuit. Such a two-valve "flip-flop" triggering circuit is described in detail in the work of Puckle entitled "Time Basis," page 50 et seq., published 1943 by John Wiley & Sons, Inc. In detail, the connections to the "flip-flop" triggering circuit include line 60 extending from junction 56 below capacitor C2 to the cathode 61 of tube V4a, the anode 62 of that tube being connected through junction 63 and thence through resistor R5 to junction 33 on line L1a. From junction 32 on line L1a a circuit extends through resistor R7 and through junction 64 to the anode 65 of the tube V4b, the cathode 66 of said tube being connected through line 67 to the junction 68 on line L2. A circuit extends from junction 69 on line L2, thence through resistor R6 to junction 70, which is connected to the grid 71 of the tube V4b, and is also connected through the condenser C4 to junction 63 on the anode lead of the tube V4a. The control grid 72 of the tube V4a is connected through line 73 to junction 64 on the anode lead of tube V4b.

From junction 34 on line L1a a circuit extends through line 75, through condenser C3 to the junction 76 on line L2.

The junction 64 forms the signal output terminal of the flip-flop circuit composed of tubes V4a and V4b interconnected as described. From junction 64 a circuit extends over line 74 through condenser C5 and thence to junction 77 and line 78, thence through resistor R8 to junction 79 on line L2. The tube V5 is of the thyratron type and has a cathode 80 that is connected through junctions 81 and 82 and thence through resistor R10 to the junction 83 on line L2. The control grid 84 of the tube V5 is connected through resistor R9 to junction 77 on the signal input circuit, the screen grid 85 of the same tube being connected by line 86 to junction 81 on the cathode circuit. The anode 88 of tube V5 is connected through junction 89 and resistor R12, junction 90, thence through resistor R13 to junction 30 on line L1. The output of tube V5 is between terminals 82 on its cathode lead and 89 on its anode lead. The terminal 82 is connected by line 91, through junction 92 to one terminal of the coil 93 of a stepping relay generally designated 100. From junction 89 on the anode lead of tube V5 the circuit extends through condenser C6, thence via line 94 and through junction 95 to the other terminal of the coil 93 of the stepping relay 100. A circuit also extends from junction 90 (between resistors R12 and R13), thence through condenser C7 and through line 96 to the terminal 97 on line L2, and a circuit extends from junction 82 (on the cathode lead of tube V5) through resistor R11 to junction 31 on line L1a.

The stepping relay which serves as a motor for driving the transfer means by which the anesthetic or other material is administered to the patient is best illustrated in the enlarged views of Figures 4 through 9. The relay or motor has a frame 100 which serves to support the magnet coil 93, the frame 100 being provided at one end with upstanding side pieces 101 and 102 which at their upper ends serve to support the pivot shaft 103 to which an armature 104 is connected. The shaft 103 has a crank arm 105 firmly attached thereon which extends outwardly, and to the outer end of it there is attached one end of a spring 106, the other end of the spring being anchored on the side arm 107 of the frame piece 101. The spring 106 tends to move the crank 105 in the direction of arrow 109, consequently turning the shaft 103 in the direction of arrow 108 and thus moving the armature 104 away from the pole piece 110 of the magnet. From the shaft 103 there also extends a long side arm 111 which reaches out beyond the coil of the magnet and at its outer end is provided with a spring dog 112 having an inwardly bent lower end 113 which is adapted to engage the teeth in the ratchet wheel 114. An eccentric boss is provided at 115 which may be adjusted to engage the back side of the lower end 113 of the dog and hence insures its engagement with the ratchet wheel 114. The arm 111 is moved up and down in the direction of the arrow 116 (Figure 6) and 117 (Figure 7). The arm 111 is pulled downwardly by the action of spring 106 when the magnet coil 93 is de-energized, but when the coil is energized the attraction of the armature 104 to the pole piece 110 causes the arm 111 to be moved in the direction of arrow 117 to the position shown in Figure 7, against the action of spring 106. This up and down swinging movement of the arm 111 which occurs each time coil 93 is energized serves to move the ratchet wheel 114 around, one tooth for each energization of the coil 93. The frame 100 of the relay also has a spring dog at 118 which prevents backward rotation of the ratchet 114. The net result is to produce rotation of the ratchet wheel 114, one tooth at a time, and this step-by-step rotation is utilized for the rotation of a screw 120.

The frame of the relay is provided with a flange 121 at one side which serves to support a pair of guide rods 122 which have their outer ends connected by the bearing plate 123, the outer end of the screw 120 being journalled at 124 in that bearing plate. The parallel guide rods 122 serve as a cross-head on which there is slidably mounted the block member generally designated 125 which is best shown in Figures 8 and 9.

The block member 125 is composed of two halves 125A and 125B which are arranged so that they can be pushed apart so that the block can be disengaged from the screw 120 to allow it to be moved along the rods 122 and screw 120 for rapid adjustment of the position of the block 125 along the length of the screw. The two halves 125A and 125B of the block 125 are held together by a pair of pins 126—126 which are threaded into the block 125B so as to be movable therewith. The pins 126 pass through the holes 127—127 of the block 125A. The outer ends of the pins 126 are fastened together by a bar 128 and between the bar and the slider half 125A there are springs 129—129 which surround each of the pins 126. As a result of the action of the springs 129, the half 125A of the slider is forced towards the half 125B, thus causing the slider neatly to close into the unitary whole as shown in Figure 8. The two halves 125A and 125B, considered as a unit, are provided with a pair of holes 132—132, one half of the hole being in each half of the slider. These holes are arranged so as to fit on the parallel rods 122 and have an internal diameter such that when the slider is in the closed position shown in Figure 8, it will slide easily yet without sloppiness upon the rods 122. The slider is also provided with a central aperture at 133 which is threaded to correspond with the threads on the rod 120. Therefore, when the slider is in the condition shown in Figure 8 and the threaded rod 120 is revolved by the action of the ratchet wheel 114, the slider is caused to progress in the direction of the arrow 135. For each stepping action of the relay the slider moves one slight increment longitudinally in the direction of arrow 135. The slider or block 125 has attached to it a stirrup at 136 which reaches out beyond the end frame 123 even when the slider is retracted to a position against the frame member 121. This stirrup is a simple bent piece of metal having an end portion 137 which abuts against the movable piston (plunger) 140 of the syringe generally designated 141, which serves as an anesthetic supply reservoir, the syringe being mounted fixedly by means of a bracket or clamp 142. The frame of the stepping relay 100 is, of course, also fixedly mounted and therefore when the relay is actuated step-by-step the slider 125 moves step-by-step in the direction of arrow 135 and the end 137 of the stirrup 136 pushes against the plunger 140 of the syringe and for each step of movement of the relay the syringe is thus likewise moved one step, thereby causing the anesthetic which is contained in the syringe to be ejected from the hypodermic needle 143. The hypodermic needle 143 is suitably connected to the patient in accordance with approved medical procedure. Where the anesthetic is ether the hypodermic syringe may be likewise filled with ether and connected by a tube to the sponge in the respiratory mask of the patient, or to any other ether administering instrumentality in the air system of the patient. The stepping relay and the syringe thus serve as a material supply and material pump means by which the required material is fed to the patient.

Where ether is used as the anesthetic the entire stepping relay 100 may be substituted with the pumping system shown in Figure 10, which serves as the transfer means by which the anesthetic is fed to the patient. In this figure the pump generally designated 150 is an impulse operated pump of the type commonly used for pumping gasoline for automotive engines. Such pumps operate one stroke for each electrical energization or pulse applied to the wires 151 serving the electrical coil of the pump. The pump, per se, forms no part of this invention and is merely utilized for pumping ether from the supply can or reservoir 153 out through the outlet pipe 152 of the pump which is connected to the respiratory mask or other instrumentality used for administering the ether to the patient. In this form the can or reservoir 153 and pump 150 are the material supply means and material pump means.

Referring again to Figure 3 where the system is used for research work it is especially desirable to maintain a record of the brain wave pattern (or potential output of the cortex or electroencephalogram, however designated) of the patient as compared to the operation of the instrument. In order to make such records a two-element recording oscillograph may most conveniently be used. This oscillograph is illustrated under the bracket III of Figure 3 and has a pair of terminals 154 and 155 which are connected through the manual switch 156 and thence through lines 157 and 158 to the terminals 21 and 26 of the amplifier 16. Thus, the brain wave pattern may be recorded by one element of the recording oscillograph. The other element of the recording oscillograph is connected from a pair of terminals 159 and 160, through lines 161 and 162 and thence through the manual switch 163 to the terminals 95 and 92, respectively, on the circuit which is connected either to the stepping relay device 100 shown in Figure 1 or to the ether pump shown in Figure 10, it being understood that the ether pump terminals 151 may be connected in place of the coil 93 of the stepping relay, depending upon the type of anesthetic administering device desired. Accordingly, with the recording device, as illustrated, the attendant physicians have a complete record of the brain wave pattern of the patient and a simultaneous and related record of the operation of the anesthetic administering system. Such records are illustrated in Figures 1 and 2.

*Operation.*—It will be assumed that the voltage regulating tubes V1 and V2 are utilized and they accordingly establish regulated voltages as previously described on lines L1a and L1b. It is also assumed that the condenser C2, which is the storage condenser, has just been discharged, thus dissipating any charge previously upon it. Accordingly, the potential at terminal 56 (below condenser C2) is at approximately the voltage of line L1a. Under such conditions tube V4b is conductive and current flows from line L1a through resistor R7 and from the anode 65 to the cathode 66 of the tube V4b through line 67 of line L2. The size of resistor R7 is made such that with current flowing through tube V4b (and with the supply voltages and constants above mentioned) a voltage of approximately 80-100 volts is maintained at junction 64. This is less than the voltage at 56.

The brain wave signal derived from the patient (or a potential output of the cortex, or electroencephalographic potential, as variously designated) after amplification by means of the amplifier 16 is applied through lines 22 and 27 and condenser C1 across the resistor R1. This brain wave signal, as amplified, is a faithful reproduction of the original brain wave signal except that it is on an amplified scale. A selected portion of this signal is picked off by means of the adjustable tap 50 on the resistor R1 and is applied to the control grid 41 of the amplifier-rectifier V3. The output of tube V3 is the rectified and amplified half wave corresponding to one half of the amplified input signal (or that portion of it selected on the adjustable resistor R1) and such output of tube V3 is applied through the milliammeter 55 (which enables the operator to read the output) and through junction 56 to the condenser C2 which accordingly begins to charge. It will be recalled that the potential at point 56, immediately after discharge of condenser C2, was approximately the potential of line L1a, but as the charge is accumulated on condenser C2, the potential across that condenser increases proportional to the quantum of charge and hence the potential at junction 56 gradually drops by steps of varying amounts until the potential at 56 approaches the potential that is meanwhile being maintained constant at point 64.

When the potential at 56 thus decreases to approximately the same potential as is maintained at point 64, tube V4a becomes conductive, or stated another way, when condenser C2 has accumulated a predetermined amount quantity of electrical charge, tube V4a becomes conductive. Then the following takes place in rapid sequence: V4a becomes conductive and it therefore establishes a circuit from terminal 56 of condenser C2 to the cathode 61 of tube V4a, thence to the anode 62 and through resistor R5, junction 33, line L1a, to junction 35 which forms the other terminal of condenser C2. Condenser C2 is thereby discharged through the resistor R5. The potential at point 63 prior to tube V4a becoming conductive, was equal to the voltage of line L1a but when V4a becomes conductive, the potential at point 63 drops momentarily during the time that condenser C2 is discharging, due to the voltage drop across resistor R5. The drop in potential at point 63 is transferred through condenser C4 to the grid 71 of tube V4b. It will be remembered that tube V4b has been conducting and its grid 71 during such period of conductivity was maintained at the voltage of line L2 by virtue of the connection through resistor R6. Momentarily, however, the voltage drop pulse at point 63, as transferred through condenser C4 causes the potential at point 70 (namely grid lead 71) to be forced in a negative direction in respect to line L2 and hence negative in respect to the cathode 66 from tube V4b. This causes tube V4b to become non-conductive and the potential at the anode terminal 64 of tube V4b therefore approaches the potential of line L1a which therefore makes the grid 72 of tube V4a even more positive with respect to the cathode than it had been as a result of the pulse transferred. As condenser C2 completes its discharge the potential drop across tube V4a becomes so small that tube V4a ceases to conduct. At this time the anode terminal 63, which during the discharge of condenser C2 had dropped in voltage below that of line L1a (namely it had dropped to about 100 volts in the illustrated example) again swings sharply positive towards the potential of line L1a. This applies a positive pulse through condenser C4 to the grid terminal 70 of grid 71 of tube V4b and the latter tube again becomes conductive. The conductivity of tube V4b again being established causes the potential at its anode terminal 64 to swing from positive down towards negative voltage (namely towards about 100 volts in the illustrated example), and this potential swing is applied through line 73 to the grid 72 of tube V4a which causes the latter to become even more sharply non-conductive.

The foregoing rapid sequence of events is carried out on a time scale determined by the time constants of the flip-flop circuit as is well known and occurs with great rapidity. The signal output from tube V4b occurs between terminals 64 and 32.

Tube V5 is of the thyratron type, and during the time that it is non-conductive, its cathode 80 is held at a potential of about 10 volts in respect to line L2 by virtue of the potentiometer voltage divider circuit which begins at junction 31 on line L1a and continues through resistor R11 to junction 82 which is the cathode terminal of tube V5, and thence through resistor R10 of tube V5 to junction 83 on line L2. The resistors R10 and R11 accordingly establish a potential at junction 82 which fixes the potential of the cathode 80 of tube V5. During such period of non-conductivity of tube V5, its control grid 84 is held negative (i. e. at the potential of line L2) by virtue of the connection through resistor R9 to junction 77 and thence through line 78 and resistor R8 to junction 79 on line L2. Accordingly, with the grid 84 negative with respect to the cathode 80, tube V5 is non-conductive. Likewise, during such period of non-conductivity of tube V5 the voltage of its anode 88 is the same as the potential of line L1 due to the connection thereto through resistors R12, junction 90 and R13 to junction 30 on line L1. The circuit from junction 30 on line L2, thence through resistor R13 to junction 90 and through condenser C7 to line L2 exerts full line voltage on condenser C7 and maintains that condenser charged. The condenser C6 is also charged during such period of non-conductivity of tube V5 by virtue of the connection of one of its terminals through resistors R12 and R13 to line L1 and by virtue of its connection through the coil 93 of the stepping relay and then through junction 92 and line 91, junction 82 and resistor R10 to junction 83 on line L2.

When the signal pulse from the anode terminal 64 of tube V4b occurs, it is transferred through condenser C5 to junction 77 and thence through resistor R9 to the control grid 84 of tube V5, and the grid then becoming positive with respect to the cathode causes tube V5 to conduct. When tube V5 thus becomes conductive, it serves as a circuit by which the charge which, as previously explained, had been stored upon condenser C6 may readily be permitted to dissipate through a circuit extending from one terminal of the condenser C6, thence through the tube V5 which is then conductive, to junction 82 on the cathode lead of the tube and thence through line 91 to the coil 93 of the stepping relay and through line 94 to the other side of condenser C6. Thus, the stored charge on condenser C6 is permitted to flow through the coil 93 of the stepping relay which causes the operation of the stepping relay through one pulse, causing the ratchet 114 to be moved one step with consequent operation of the plunger of the hypodermic syringe through one increment of movement and hence one unit of anesthetic is administered to the patient. In the event an ether pump, such as that shown in Figure 10, is used, the pump operates one pulse and one unit by volume of ether is pumped to the respiratory mask or other ether inhalating device used on the patient. Such unit quantity of anesthetic from syringe 141 or from pump 150 is recorded on the traces shown in Figures 1 and 2, as the vertical mark or "pip" on such traces. The status of conductivity of tube V5 causes little current to be drawn through it from line L1 because of the combined resistances of resistors R13, R12 and R10 in the circuit extending through tube V5 from line L1 to line L2. Hence, tube V5 stops conducting when the charge on condenser C6 is dissipated through the stepping relay or through the ether pump of Figure 10.

The sharp discharge of condenser C6 might cause a transient impulse to be imposed upon line L1 under some conditions and in order to prevent any possible false signals being reflected back to the input circuit of tube V3, there is provided condenser C7 as a reservoir of supply which serves to re-charge condenser C6 through resistor R12. As a further means of absorbing any transient that might be impressed upon line L1 and thence upon line L1a, there is provided the condenser C3 which stands connected from line L1a to line L2. Any sharp transient or wave-front thus imposed upon line L1a is absorbed by condenser C3 which therefore does not permit the transient to reach the input of tube V3.

Referring again to the correlated recordings shown in Figures 1 and 2, it will be observed that the "pips" or short vertical markings recording the successive injections of anesthetic occur only with moderate frequency when the patient is in the resting position. However, such input of anesthetic causes the patient to progress to the condition of "light anesthesia," where the increased brain wave signal results in a more frequent actuation of the anesthetic administering syringe or pump, as indicated by the more frequent short vertical markings or "pips" on the anesthetic record. These more frequent injections of anesthetic cause the patient to progress to the state of "moderate anesthesia" and as a result of the progress to such stage of "moderate anesthesia," the brain wave of the patient decreases in activity as indicated by the recording so marked. As a result of this decreased brain wave activity, the system causes a less frequent administration of anesthetic. Depending upon the setting of resistor R1, the patient may therefore be held in the condition of "light," "moderate" or "deep" anesthesia. A point of equilibrium is reached at any setting of resistor R1, at which the rate of infusion of the anesthetic drug balances the rate of removal or destruction of the anesthetic by the tissues.

Thus, the system is put into operation by initially injecting a small amount of anesthetic agent into the patient. Upon reaching the brain of the patient the anesthetic stimulates the cortical neurones and increases their electrical output, and this in turn causes an increase in the rate of administration of the drug by action of the system. In this phase the system will be seen to be self-augmenting, or in the parlance of the electronic arts, it has the effect of a positive feedback. As soon as the drug reaches the concentration at which suppression of cortical electrical activity of the patient commences, the system changes to a self-limiting system, or in electronic parlance, it reaches a state of negative feed-back. It is in this phase that the system settles into equilibrium and maintains a depth of anesthetic which is dependent upon the adjustment of resistor R1.

Because of the feed-back characteristic of the system during operation, the apparatus has some of the properties of a hemostatic system, and the system accordingly tends to compensate for factors which disturb the equilibrium. For example, if a leak should develop in the tube leading to the patient for making intravenous injections of the anesthetic, or should a leak develop or dilution occur in the administration of ether by way of respiratory system or otherwise, the machine automatically increases its rate of administration in an attempt to compensate for the attendant losses of anesthetic. Complete compensation is not, however, attained since the system as a whole has a dropping stimulus-response curve similar to the speed-load curve of a governor-steam engine system. A change in received stimulus which in this illustration is the brain wave signal results in a relatively slight shift of the system to a new equilibrium point on the stimulus-response curve, in a manner analogous to the shift in equilibrium of a governor-steam engine system where load changes.

By utilizing the system, animals have been kept automatically anesthetized for periods up to two or three days without circuit readjustment, and the system has been used with complete confidence on human beings for anesthetization during operative procedures.

Referring to Figure 11, the connections to the patient by means of the scalp hooks 10, 12 and 11 are identical with those previously described with reference to Figure 3. The brain-wave signal as picked up by such connections 10, 11 and 12, however, is in this instance applied to the input terminals 164, 165 and ground terminal 166 of a battery operated preamplifier generally designated 167. The battery operated preamplifier 167 is of the push-pull type and has output terminals 168 and 169 which are connected to the input terminals 174 and 175 of a variable band-pass filter generally designated 170. The band-pass filter is designed so as to permit frequencies in the range of approximately three cycles per second to 30 cycles per second to be passed therethrough to the output terminals 176 and 177 which are connected to the input terminals 178 and 179 of a push-pull power amplifier generally designated 180 having output terminals 181 and 182. The terminal 182 is connected to the grid lead 49 and terminal 181 is connected to line L2. The anesthesia administering circuits shown under the bracket II of Figure 11 are identical with those previously described with reference to Figure 3 and hence need no further description.

In operation the system shown in Figure 11 is responsive to those frequencies of the brain wave signal in the range of about 3 to about 30 cycles only and hence the system is not disturbed by slow voltage shifts which not infrequently may be found to occur in operating rooms due to the accumulation of a static charge on portions of the system, as for example may occur when one of the attendants or surgeons may have shoes which are rubber soled, thereby applying to the patient a static voltage which may then be reflected as a slow shift in voltage on the brain wave signal circuits connected to the patient. Likewise, high frequency apparatus, such as diathermy apparatus or X-ray equipment causes no ill effects when utilizing the band-pass filter 170 in the circuit.

Referring to Figure 12 the apparatus includes between the patient and the anesthesia administering circuits shown under the bracket II a comparator shown generally over the bracket V. This comparator circuit receives the brain wave signal by virtue of the connections 10, 11 and 12, as previously described, which are impressed upon the leads 190, ground lead 191 and lead 192, respectively. Lead 190 is connected to the control grid 193 of an amplifier tube generally designated 194 which is housed in the chassis 195 that is connected to the ground line 191. The tube 194 is provided with an anode 196 that is connected through line 197 to terminal 198 on the line L1a which has a regulated voltage as previously described. The indirectly heated cathode 200 of the tube 194 is connected through junction 201 and resistor 202 to junction 203 on line L2. The resistor 202 is bridged by a condenser 205 that is connected to junction 201 via line 206 and junction 207, and is connected to line L2 at junction 208. Accordingly, the signal input to the amplifier 194 is impressed upon control grid 193 and line L2 and tube 194 becomes conductive and current flows through its cathode-anode circuit which is proportional always to the input signal, thereby causing the voltage at point 201 to vary in accordance with such input signal. From terminal 201 on the cathode, lead line 206 extends through junction 207 and junction 210 to one terminal of resistor 211, the other terminal of said resistor being connected through line 212 to the negative terminal 213 of a bias battery 215, the positive terminal of which is connected back to junction 210. The battery 215 accordingly imposes a continuous potential across resistor 211 and by virtue of the variable tap 216 a selected portion of this voltage is subtracted from the potential at point 201 and it is accordingly this difference in potential which is then applied to line 218 that controls the control grid 41 of the tube V3. As a result the amplified input signal of the brain wave pattern is compared to a datum potential, namely a selected portion of the potential of battery 215 and any difference in potential between the signal and such datum or deviation in potential is then applied to line 218 is the "signal potential" for actuating tube V3. The system accordingly operates on the error-actuated principle rather than on the drooping-characteristic principle as explained with reference to the system shown in Figure 3. The system shown in Figure 12 has especial advantage because of its high sensitivity to change.

The herein described system and method can be used without modification for automatic anticonvulsive therapy for conditions such as continuous epileptic seizure, i. e. "status epilepticus." In this condition continuous high voltage brain waves (up to one millivolt) having predominate frequencies in the range of 3 to 10 cycles per second are present as long as such seizures continue. For treatment, the brain wave signal (electroencephalographic potential) is picked up as previously described. If the system of Figure 11 is being used, band pass filter 170 is adjusted (or designed) to pass the 3 to 10 cycles frequency band. Syringe 141 is then filled with an anticonvulsant drug such as pentothal, luminal or amytal and administered intravenously. The effect of such drugs is to decrease the seizure and also the brain wave signal, with the result that the patient is gradually brought down to a condition where the brain wave pattern is normal, that is to say there is a reduction of several hundred per cent fall in integrated potential output of the brain wave.

Where the system is used for continuous control of heart function a suitable drug is chosen for the treatment and in this case the incoming signal is an electrocardiogram or the pulse rate may be translated as a generated electrical signal (by microphone for example) and utilized as the incoming signal of the apparatus. In similar manner respiratory signals, skin temperature signals, etc. may be picked up and utilized for the automatic administration of the appropriate drugs.

As many apparently widely different embodiments of this invention may be made without departing from the spirit and scope thereof, it is to be understood that I do not limit myself to the specific embodiments herein.

What I claim is:

1. An automatic apparatus for administering material to a patient comprising an amplifier having an input connectable to a patient and an output for amplifying a physiological electrical potential of a patient, capacitor means connected to the output of said amplifier for storing and integrating said amplified signal, means connected to said capacitor means and connectable to said patient, said means being responsive to the quantum of stored integrated electrical charge of said capacitor means when the quantum of charge reaches a predetermined value for administering to the patient a predetermined amount of said material and for simultaneously dissipating said charge.

2. An automatic apparatus for administering to a patient material which varies the physiological electrical output of the patient comprising an amplifier having input and output terminals, said input terminals being adapted to be connected to the patient for obtaining a physiological electrical output signal from the patient, means connected to the output of the amplifier for integrating said physiological output signal, said means including means connectable to the patient for moving said material to said patient at a rate proportional to the integrated physiological electrical output signal of the patient.

3. An automatic apparatus for administering to a patient material which varies the electroencephalographic potential of said patient comprising an amplifier having input and output terminals, said input terminals being adapted to be connected to the head of a patient for obtaining an electroencephalographic potential signal from said patient, integrating means for integrating said electroencephalographic potential signal and means connected to said integrating means including means connectable to said patient for moving said material to said patient at a rate proportional to the integrated electroencephalographic potential signal of said patient.

4. An automatic apparatus for administering to a patient material which varies the physiological electrical output of the patient comprising an amplifier having input and output terminals, means for connecting the input terminal to a patient for obtaining said physiological electrical output signal from said patient, motor means connected to the output terminals of said amplifier and material feeding means connected to and driven by said motor means and having a material delivery outlet adapted to be connected to the patient for delivering material to the patient in response to the amplified physiological electrical output signal received from the patient.

5. An automatic apparatus for administering to a patient material which varies the physiological electrical potential of said patient comprising an amplifier having input and output terminals, said input terminals being adapted to be connected to a patient, energy storing means connected to the output terminals of said amplifier for accumulating electrical energy in proportion to the integral of the amplified potential output of the patient, material transferring means having a material delivery outlet adapted to be connected to said patient, said transferring means being also connected to said energy storing means and movable in response thereto, for delivering a prescribed amount of material to said patient when the charge in said energy storing means reaches a predetermined amount and simultaneously dissipating said charge preparatory to accumulating another charge.

6. An automatic apparatus for administering anesthetics and the like materials to patients comprising means having input terminals adapted to be connected to the patient who is to be anesthetized for impressing the electroencephalographic potential of said patient on said input terminals, said means including a device for accumulating an electrical charge at a rate proportional to the integral of the amplified electroencephalographic potential signal of the patient being anesthetized, and means connected to said device for accumulating said charge and responsive to each predetermined accumulation of charge thereon for administering a predetermined amount of said anesthetic or the like material to the patient.

7. An automatic apparatus for administering anesthetics or the like materials to a patient comprising means having input terminals adapted to be connected to a patient who is to be anesthetized and including means for accumulating an electrical charge at a rate proportional to the integral of the electroencephalographic potential signal of said patient being anesthetized, and means connected to said means for accumulating said charge and responsive to a predetermined accumulation of charge thereon for administering to the patient a predetermined amount of anesthetic or the like material and for simultaneously dissipating said charge on said means for accumulating said charge.

8. An automatic apparatus for administering anesthetics and the like materials to patients comprising means having input terminals adapted to be connected to a patient who is to be anesthetized, said means including an amplifier having output terminals, condenser means connected to said amplifier output terminals for storing and integrating the resultant amplified output, a discharge circuit connected to said condenser means and through which said condenser may discharge when the potential of said condenser means reaches a predetermined value, and motor transfer means connected to said discharge circuit and responsive to the discharge of said condenser means for moving predetermined amounts of said material to the patient.

9. An automatic apparatus for administering anesthetics and the like materials to patients comprising means having input terminals adapted to be connected to a patient who is to be anesthetized, said means including an amplifier having output terminals, condenser means connected to said amplifier output terminals for storing and integrating the resultant amplified output, a discharge circuit connected to said condenser means and through which said condenser may discharge when the potential of said condenser means reaches a predetermined value, a triggering circuit connected to and responsive to the potential of the condenser means for discharging the condenser through said discharge circuit, and motor transfer means connected to said discharge circuit and responsive to the discharge of said condenser means for moving predetermined amounts of said material to the patient.

10. The apparatus of claim 9 further characterized in that said triggering circuit comprises a "flip-flop" circuit.

11. An automatic apparatus for administering anesthesia to a patient comprising an amplifier having input and output terminals, said input terminals being adapted to be connected to the scalp of the patient for supplying to the input terminals the electroencelphalographic potential of said patient, an anesthetic supply reservoir, transfer means connected to said supply reservoir for moving the anesthetic from the supply reservoir, said transfer means being adapted to be connected to the patient, and means connected to the output of said amplifier and to said transfer means for integrating the amplified electroencephalographic potential signal of said patient and for actuating said transfer means so as to transfer to the patient a predetermined amount of anesthetic when the integral of the electroencephalographic potential signal of the patient reaches a predetermined amount.

12. An automatic device for administering anesthetics and the like to patients comprising an amplifier having input and output terminals, said input terminals being adapted to be connected to the patient for receiving from the patient a physiological electrical output signal, said amplifier including means for rectifying the signal so received, a condenser connected to the output of said amplifier for storing said rectified signals, an auxiliary circuit connected to said condenser for discharging it when the condenser becomes charged to a predetermined voltage, thereby permitting said condenser to begin recharging immediately, a material supply and material pump means connected to said auxiliary circuit so as to be actuated thereby for pumping measured amounts of said material to the patient each time said condenser is discharged through said auxiliary circuit.

13. An automatic apparatus for administering anesthetics and the like materials to a patient comprising an amplifier having input and output terminals, said input terminals being adapted to be connected to the head of a patient for obtaining an electroencephalographic potential signal from the patient, a band pass filter capable of transmitting electrical signals in the frequency range of 3 to 30 cycles per second connected to the output and said amplifier, and acumulator means connected to said band pass filter and responsive to the signals transmitted therethrough for integrating and accumulating said signals, and material supply and transfer means adapted to be connected to the patient and connected to said accumulator means and responsive to the integral of the transmitted signal thereon when said integral reaches a predetermined amount for transferring to the patient a predetermined quantity of said material.

14. An automatic apparatus for administering anesthetics to a patient comprising means for amplifying a received electroencephalographic potential signal of the patient, said means having input terminals adapted to be connected to the patient and having output terminals, a band pass filter transmission network connected to output terminals of said amplifier, said filter network being connected to accumulator means for integrating said signal and material delivery means connected to said accumulator means and adapted to be connected to the patient for delivering material to said patient at a rate proportional to said integrated signal.

15. An apparatus for administering anesthetics and the like materials to a patient comprising an amplifier having input terminals adapted to be connected to the patient for receiving an electroencephalographic potential signal from the patient, said amplifier having output terminals, a potential source forming a comparison voltage connected to said output terminals and means for accumulating a charge proportional to the difference between the amplified signal received from the patient and said comparison voltage, and material transferring means connected to said means for accumulating said charge and adapted to be connected to the patient for transferring material to the patient at a rate proportional to the rate of accumulation of said charge.

16. An apparatus for administering anesthetics and the like materials to a patient comprising an amplifier having input and output terminals, said input terminal being adapted to be connected to the head of a patient for receiving the electroencephalographic potential signal from the patient, said output terminal being connected to a potential source forming a voltage of comparison, means for accumulating a charge connected to said potential source and said output terminals of the amplifier for accumulating a charge proportional to the difference between an amplified electroencephalographic potential signal and said voltage of comparison, material transfer means connected to said means for accumulating said charge and adapted to be connected to said patient for transferring a predetermined amount of said material to the patient each time the charge accumulated on said means for accumulating reaches a predetermined amount, and means connected to said means for accumulating a charge for dissipating the charge thereon as said predetermined amount of material is transferred to the patient.

References Cited in the file of this patent

UNITED STATES PATENTS

| Number | Name | Date |
|---|---|---|
| 978,728 | Frink | Dec. 13, 1910 |
| 2,225,201 | Anderson | Dec. 17, 1940 |
| 2,254,833 | Ashkenaj | Sept. 2, 1941 |
| 2,409,033 | Garceau | Oct. 8, 1946 |
| 2,416,158 | Coykendall | Feb. 18, 1947 |
| 2,419,682 | Guillemin | Apr. 29, 1947 |
| 2,457,744 | Sturm | Dec. 28, 1948 |
| 2,457,977 | Cookson | Jan. 4, 1949 |
| 2,498,672 | Glass | Feb. 28, 1950 |